(12) United States Patent
Huang et al.

(10) Patent No.: US 10,089,781 B2
(45) Date of Patent: Oct. 2, 2018

(54) THREE-DIMENSIONAL POINT CLOUD MODEL RECONSTRUCTION METHOD, COMPUTER READABLE STORAGE MEDIUM AND DEVICE

(71) Applicant: SHENZHEN INSTITUTES OF ADVANCED TECHNOLOGY CHINESE ACADEMY OF SCIENCES, Shenzhen, Guangdong (CN)

(72) Inventors: Hui Huang, Guangdong (CN); Shihao Wu, Guangdong (CN); Minglun Gong, Guangdong (CN); Matthias Zwicker, Guangdong (CN); Daniel Cohen-Or, Guangdong (CN)

(73) Assignee: Shenzhen Institutes of Advanced Technology Chinese Academy of Sciences, Shenzhen Guangdong (CN)

( * ) Notice: Subject to any disclaimer, the term of this patent is extended or adjusted under 35 U.S.C. 154(b) by 4 days.

(21) Appl. No.: 15/389,959

(22) Filed: Dec. 23, 2016

(65) Prior Publication Data
US 2017/0193692 A1    Jul. 6, 2017

Related U.S. Application Data

(63) Continuation of application No. PCT/CN2015/100005, filed on Dec. 30, 2015.

(51) Int. Cl.
*G06T 17/00* (2006.01)
*G06T 5/00* (2006.01)
(Continued)

(52) U.S. Cl.
CPC .............. *G06T 17/00* (2013.01); *G06T 5/002* (2013.01); *G06T 7/20* (2013.01); *G06T 7/60* (2013.01);
(Continued)

(58) Field of Classification Search
None
See application file for complete search history.

(56) References Cited

FOREIGN PATENT DOCUMENTS

| CN | 102467753 | 5/2012 |
|----|-----------|--------|
| CN | 103065354 | 4/2013 |

(Continued)

OTHER PUBLICATIONS

Cao, Junjie, et al. "Point cloud skeletons via laplacian based contraction." Shape Modeling International Conference (SMI), 2010. IEEE, 2010.*

(Continued)

*Primary Examiner* — Diane Wills
(74) *Attorney, Agent, or Firm* — Hamre, Schumann, Mueller & Larson, P.C.

(57) ABSTRACT

The present disclosure provides a three-dimensional point cloud model reconstruction method and a device. The method comprises: 1) sampling and WLPO-consolidating an input point set to generate an initial surface point set, copying the initial surface point set as an initial position of an interior skeleton point set, to establish a correspondence relation between surface points and skeleton points; 2) moving points in the interior skeleton point set inwards along a direction opposite to a normal vector thereof, to generate interior points; 3) using a self-adaptive anisotropic neighborhood as a regularization term to perform an optimization of the interior points, and generating skeleton points; 4) performing a consolidation and completion of the initial surface point set using the skeleton points, to generate consolidated surface points; 5) reconstructing a three-dimensional point cloud model according to the skeleton points, the surface points and the correspondence relation between the surface points and the skeleton points.

12 Claims, 5 Drawing Sheets

(51) Int. Cl.
*G06T 7/20* (2017.01)
*G06T 7/60* (2017.01)
*G06T 13/40* (2011.01)

(52) U.S. Cl.
CPC .... *G06T 13/40* (2013.01); *G06T 2207/10028* (2013.01); *G06T 2210/56* (2013.01)

(56) References Cited

FOREIGN PATENT DOCUMENTS

| CN | 104063898 | 9/2014 |
|---|---|---|
| WO | 2015149302 | 10/2015 |

OTHER PUBLICATIONS

Huang, Hui, et al. "Consolidation of unorganized point clouds for surface reconstruction." ACM transactions on graphics (TOG) 28.5 (2009): 176.*

Huang, Hui, et al. "L1-medial skeleton of point cloud." ACM Trans. Graph. 32.4 (2013): 65-1.*

International Search Report issued in the corresponding PCT application No. PCT/CN2015/100005, dated Jul. 1, 2016, 5 pages.

\* cited by examiner

THREE-DIMENSIONAL POINT CLOUD MODEL RECONSTRUCTION METHOD, COMPUTER READABLE STORAGE MEDIUM AND DEVICE

This application is a continuation of International Application No. PCT/CN2015/100005, filed on Dec. 30, 2015, which is hereby incorporated by reference in its entirety.

TECHNICAL FIELD

The present disclosure relates to image processing techniques, and particularly, to a three-dimensional point cloud model reconstruction method, a computer readable storage medium and a device.

BACKGROUND

In production applications nowadays, a main bottleneck of the development of the three-dimensional techniques, such as computer aided design, reverse engineering, virtual reality, and three-dimensional animation and game, is that there is still no a convenient method for quickly obtaining a three-dimensional model stored in the computer. In recent years, the three-dimensional laser scanner is widely applied by virtue of its advantage of conveniently and flexibly acquiring three-dimensional surface data of a real object. After the researches of more than twenty years, the technique of reconstructing a three-dimensional model from relatively complete point cloud data has been mature. However, it is restricted from being a universal inverse reconstruction technique mainly because that a large-scale data missing of the point cloud data usually occurs, which cannot be solved by the existed hardware scanning device.

The so called point cloud model generally means that a three-dimensional scanning device emits scanning light to a surface of an object to be measured, and reflected light is received to calculate a set of three-dimensional coordinate points on the surface of the object. The so called point cloud three-dimensional reconstruction means based on certain point cloud model data, complementing and reconstructing grid data representing the source model, for the convenience of computer rendering and user interaction. But how to directly and quickly obtain a practical point cloud model by scanning the point cloud data is still a problem. The difficulty of the point cloud data processing is that the point cloud data is usually dispersed, with significant missing data, noises, and outliers. In addition, the point cloud completion is a recognized ill-posed problem, wherein all the methods deduce unknown information from already existed information, and no method can ensure that the region complemented using an algorithm is consistent with the source model.

The point cloud completion method in the prior art fits and fills the lost information using a quadric surface according to local information of the point cloud model. This method can well fill the holes in a small area, but cannot solve the large-scale data missing problem. Considering more global information is an important way to improve the existed completion method.

SUMMARY OF THE DISCLOSURE

The embodiments of the present disclosure provide a three-dimensional point cloud model reconstruction method, includes:

1) sampling and WLOP-consolidating an input point set to generate an initial surface point set, and copying the initial surface point set as an initial position of an interior skeleton point set, to establish a correspondence relation between surface points and skeleton points;

2) moving points in the interior skeleton point set inwards along a direction opposite to a normal vector thereof, to generate interior points;

3) using a self-adaptive anisotropic neighborhood as a regularization term to perform an optimization of the interior points, and generating skeleton points;

4) performing a consolidation and completion of the initial surface point set using the skeleton points, to generate consolidated surface points;

5) reconstructing a three-dimensional point cloud model according to the skeleton points, the surface points and the correspondence relation between the surface points and the skeleton points.

In addition, an embodiment of the present disclosure further provides a computer readable storage medium containing computer readable instructions, wherein when being executed, the computer readable instructions enable a processor to perform at least the operations in the above three-dimensional point cloud model reconstruction method.

Meanwhile, the present disclosure further provides a device, includes:

a scanning module for scanning a model to acquire an input point set;

a memory for storing program instructions;

a processor connected to the scanning module and the memory, for executing the program instructions in the memory, and processing the input point set in the steps in the above three-dimensional point cloud model reconstruction method.

In order that the aforementioned and other objectives, features and advantages of the present disclosure are more easily to be understood, preferred embodiments will be described in details with reference to the accompanying drawings.

BRIEF DESCRIPTIONS OF THE DRAWINGS

In order to more clearly describe the technical solutions in the embodiments of the present disclosure or the prior art, the accompanying drawings to be used in the descriptions of the embodiments or the prior art will be briefly introduced as follows. Obviously, the accompanying drawings in the following descriptions just illustrate some embodiments of the present disclosure, and a person skilled in the art can obtain other accompanying drawings from them without paying any creative effort.

DETAILED DESCRIPTIONS

Next, the technical solutions in the embodiments of the present disclosure will be clearly and completely described with reference to the accompanying drawings of the embodiments of the present disclosure. Obviously, those described herein are just parts of the embodiments of the present disclosure rather than all the embodiments. Based on the embodiments of the present disclosure, any other embodiment obtained by a person skilled in the art without paying any creative effort shall fall within the protection scope of the present disclosure.

Figure 1:
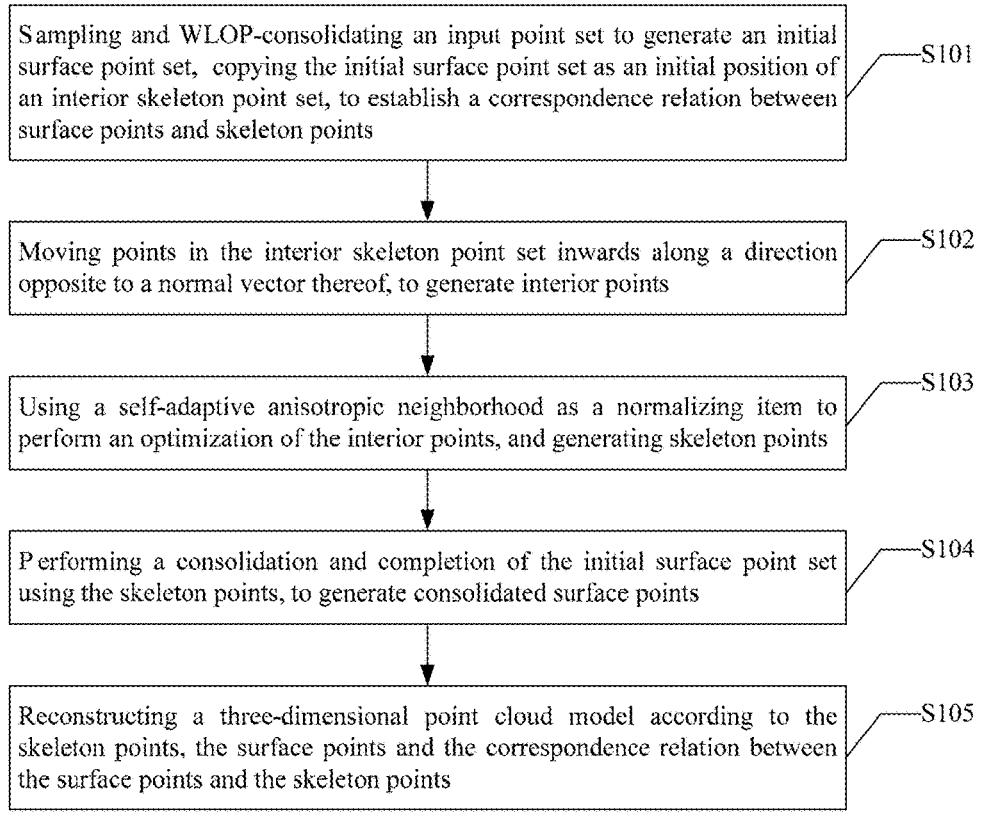
FIG. 1 is a flowchart of a three-dimensional point cloud model reconstruction method provided by the present disclosure.

An embodiment of the present disclosure provides a three-dimensional point cloud model reconstruction method. As illustrated in FIG. 1, which is a flowchart of a three-dimensional point cloud model reconstruction method provided by the present disclosure, comprising:

step S101: sampling and WLOP-consolidating an input point set to generate an initial surface point set, and copying the initial surface point set as an initial position of an interior skeleton point set, to establish a correspondence relation between surface points and skeleton points;

step S102: moving points in the interior skeleton point set inwards along a direction opposite to a normal vector thereof, to generate interior points;

step S103: using a self-adaptive anisotropic neighborhood as a regularization term to perform an optimization of the interior points, and generating skeleton points;

step S104: performing a consolidation and completion of the initial surface point set using the skeleton points, to generate consolidated surface points;

step S105: reconstructing a three-dimensional point cloud model according to the skeleton points, the surface points and the correspondence relation between the surface points and the skeleton points.

An embodiment of the present disclosure provides a computer readable storage medium containing computer readable instructions, wherein when being executed, the computer readable instructions enable a processor to at least perform the three-dimensional point cloud model reconstruction method.

Figure 2:
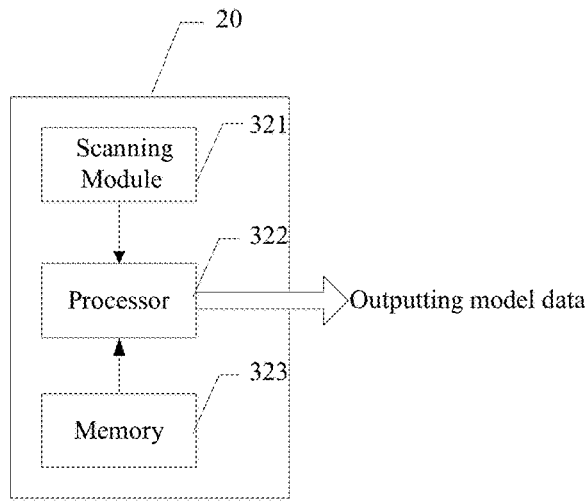
FIG. 2 is a diagram of a structure of a device provided by the present disclosure.

Meanwhile, the present disclosure provides a device, as illustrated in FIG. 2, which is a diagram of a structure of a device 20 provided by the present disclosure, comprising:

a scanning module 321 for scanning a model to acquire an input point set;

a memory 323 for storing program instructions;

a processor 323 connected to the scanning module and the memory, for executing the program instructions in the memory, processing the input point set in the following steps, and outputting a model:

1) sampling and WLOP-consolidating an input point set to generate an initial surface point set, and copying the initial surface point set as an initial position of an interior skeleton point set, to establish a correspondence relation between surface points and skeleton points;

2) moving points in the interior skeleton point set inwards along a direction opposite to a normal vector thereof, to generate interior points;

3) using a self-adaptive anisotropic neighborhood as a regularization term to perform an optimization of the interior points, and generating skeleton points;

4) performing a consolidation and completion of the initial surface point set using the skeleton points, to generate consolidated surface points;

5) reconstructing a three-dimensional point cloud model according to the skeleton points, the surface points and the correspondence relation between the surface points and the skeleton points.

The present disclosure mainly proposes a new point cloud presentation to solve the problems of denoising and hole filling for the point cloud model.

Figure 3:
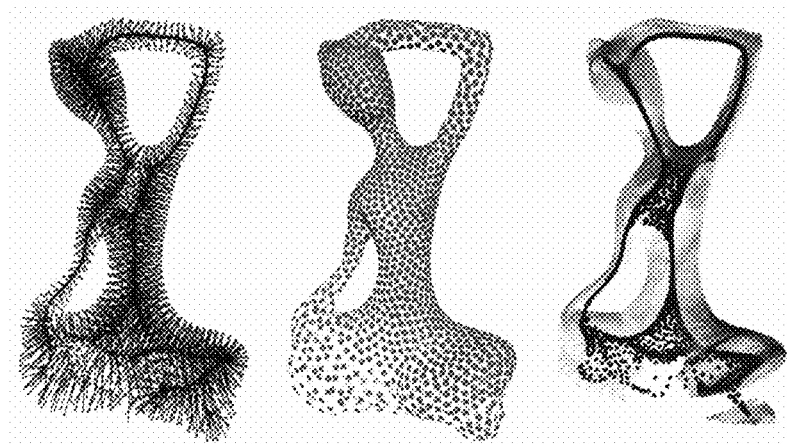
FIG. 3 is a diagram of a comparison between a point cloud presentation in the present disclosure and a point cloud presentation in the prior art.

As illustrated in FIG. 3, assuming that a modern three-dimensional point cloud scanning device can quickly acquire corresponding three-dimensional point cloud data of the computer. But such data is usually accompanied with a significant missing data and much noise, as indicated by the black points in the right picture of FIG. 3. The purpose of the method is to automatically acquire a line segment set as shown in the left picture of FIG. 3. One end of a line segment is an consolidated surface point, and the other end thereof is a skeleton point representing global topological information of an object. The main innovation point of the method is to homogeneously process the local surface information and semi-global skeleton information of the three-dimensional model, i.e., the skeleton information is extracted according to the surface information of the model, the lost information is complemented using the extracted skeleton information, and finally the two types of duality information is jointly consolidated.

In order to better complement the point cloud data, extracting a skeleton from the point cloud is an important step. Since the skeleton contains semi-global topology and volume information of the object, the extraction of the skeleton of the point cloud is actually a process of understanding the shape of the original object. Once the skeleton of the point cloud is acquired, we can fill the holes and enhance the point cloud data using the skeleton. Being different from the existed method of extracting the skeleton of the point cloud, the skeleton extracted by the present disclosure is a combined skeleton with both a one-dimensional curve and a two-dimensional slice, rather than a conventional one-dimensional curve skeleton. In contrast, the one-dimensional curve skeleton is more abstract, while the combined skeleton has a richer presenting capability. Specifically, the method generates a one-dimensional curve in a tubular structure region of the model, and generates a two-dimensional slice in other regions. By using such characteristic of the combined skeleton, a targeted policy can be taken during the point cloud completion. Thus, how to extract a combined skeleton from the point cloud is one of the key points of the present disclosure.

The closest solution: the present disclosure proposes a new point cloud presentation, which concerns the point cloud denoising and consolidation, the point cloud skeleton extraction, and the point cloud completion and reconstruction in the prior art, and the present disclosure makes an improvement to the point cloud denoising and consolidation, the point cloud skeleton extraction, and the point cloud completion and reconstruction in the prior art. Next, the best methods of the three directions in the prior art will be respectively introduced and compared with the present method.

Point Cloud Denoising and Consolidation

The best method for point cloud denoising consolidation is WLOP, which will be briefly introduced as follows.

The locally optimal projection projects (down-samples) a dispersed point cloud to a new point set which better presents the potential model of an object. In addition to the denoising function of the conventional filtering algorithm, it can also simplify and homogenize the point cloud while promoting the calculation of the normal vector and the topological structure of the point cloud. The algorithm has the advantages of parameter-free, robust and high-efficient, without using the normal vector information of the point. The principle of the algorithm is:

a dispersed point set $C=\{c_j\}_{j \in J} \subset R^3$ is given, and LOP defines a projection point set $P=\{p_i\}_{i \in I} \subset R^3$. Assuming that k iterative operations need to be performed, $k=0, 1, 2 \ldots$, then the following optimal equation is available, for the purpose of minimizing P:

$$P^k = E_1 + \mu E_2$$
$$E_1 = \sum_{i \in I} \sum_{j \in J} \|p_i - c_j\| \theta(\|p_i^k - c_j\|)$$
$$E_2 = \sum_{i' \in I \setminus \{i\}} \eta(\|p_i - p_{i'}^k\|) \theta(\|p_i^k - p_{i'}^k\|)$$

wherein, the point set P is obtained by a random down-sample from an original point set C. Generally, the effect of the algorithm is improved when the number of pints of P is reduced. But if the number of points is too small, the details of the prototype may be lost. $\|.\|$ is a secondary paradigm, $\theta(r)=e^{-r^2/(h/4)^2}$ is a quickly decreasing weighting function to define a range of adjacent point search. $\eta(r)=-r$ is a quickly decreasing penalty function to prevent points in the point set P from being too close to each other. Regarding the parameters, $0 \leq \mu < 0.5$ is used to control energy of $E_2$, and usually $\mu=4.5$. As to h, it is defaulted as $h=4\sqrt{d_{bb}/m}$, wherein $d_{bb}$ is a diagonal line of a bound cube of the three-dimensional model, m is the number of points in C, and the default value can meet most requirements. In the intuitive geometrical significance, $E_1$ is equivalent to an "attractive force" which pulls each point $x_i$ in $P^k$ to corresponding to central position of an adjacent point set in C, so that $P^k$ presents the original model implied in P while eliminating the noise. $E_2$ is equivalent to a "repulsive force" which causes points in $P^k$ to be repulsive to each other, and the repulsive force increases when two points are closer to one another so as to achieve a global homogenization. When the two forces in $P^k$ are minimized, they are relatively balanced, and the obtained projected point set P is simple and homogeneous.

Density Weighted Locally Optimal Projection (WLOP): observations show that the LOP algorithm does not causes aggregation or vibration under some situations, and the effect of global homogenization is not good enough. Because the function of $E_1$ is to project each point to a central position of the local distribution. When the input point set are highly not homogeneous, the final result is that the dense area is still relatively dense regardless of the selection of $P^0$, and the calculation of the normal vector will be adversely influenced. Thus, WLOP adds a weighting function describing the dense degree of the point cloud:

$$v_i = 1 + \sum_{j' \in J \setminus \{j\}} \theta(\|c_j - c_{j'}\|)$$

$$\omega_i^k = 1 + \sum_{i' \in I \setminus \{i\}} \theta(\|p_i^k - p_{i'}^k\|), k = 0, 1, 2 \ldots$$

wherein, $c_j \in C$, $p_i \in P$. At the dense part of the point cloud, the "attractive force" can be decreased by $v_i$, and the "repulsive force" can be increased by $w_i^k$. The two functions are added into LOP for solving the optimal equation:

$$p_i^{k+1} = \sum_{j \in J} c_j \frac{\alpha_{ij}^k / v_j}{\sum_{j \in J}(\alpha_{ij}^k / v_j)} + \mu \sum_{i' \in I \setminus \{i\}} (p_i^k - p_{i'}^k) \frac{\omega_{i'}^k \beta_{ii'}^k}{\sum_{i' \in I \setminus \{i\}}(\omega_{i'}^k \beta_{ii'}^k)}$$

$$\text{wherein, } \alpha_{ij}^k = \frac{\theta(\|p_i - c_j\|)}{\|p_i - c_j\|}, \beta_{ii'}^k = \frac{\theta(\|p_i^k - p_{i'}^k\|)|\eta(\|p_i^k - p_{i'}^k\|)|}{\|p_i^k - p_{i'}^k\|},$$

and $p_i^{k+1}$ indicates coordinates of the $i^{th}$ point in the (k+1)th iteration. On the other hand, certain outliers outside the model may be obtained sometimes when the point cloud is scanned. In that case, those outliers of a relatively low density can be eliminated quickly using the definition of the density.

WLOP in the prior art is introduced as above, and the present disclosure inherits the idea of WLOP in the aspect of denoising, but has the following distinctions.

1. The objectives of this solution include data completion in addition to data denoising. That is, the sample point p may be at a position having no input data point nearby. Thus two situations may be considered simply.

(1) If there are many input points $c_j$ near the sample point $p_i$, the data fitting term ("attractive force") of WLOP is still used.

(2) If the sample point $p_i$ does not have enough input points $c_j$ as the basis of data fitting, our newly defined volume preservation term may be used, i.e., the sample point $p_i$ shall keep being consistent with adjacent points $p_j$ in "volume" so far as possible. In a specific operation, assuming that a skeleton point set $Q=\{q_i\}_{i \in I} \subset R^3$ has been calculated, and the sample points are one-to-one corresponding to the skeleton points. The volume information of the sample point $p_i$ is presented with the connection line to a corresponding skeleton point $q_i$. The detailed algorithm will be introduced later.

Figure 4:
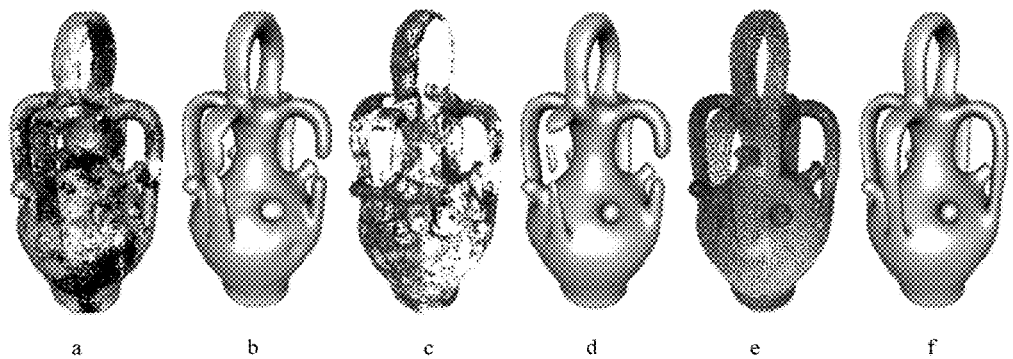
FIG. 4 is a diagram of a comparison between a grid reconstruction effect in the present disclosure and a grid reconstruction effect in the prior art.

In fact, the algorithm of this solution does not obligatorily sort the sample points P into those of two situations, but adds a weighting function to mix the data fitting term and the volume preservation term. That is, the weight of the data fitting term is higher, when the sample point $p_i$ is close to the input data point and the volume variation around is large; and the weight of the volume preservation term is higher, when the sample point $p_i$ is far away from the input data point and the volume variation around is consistent. Thus, WLOP merely keeps a smooth surface based on existed data, while this solution adds a volume preservation (smoothing) term, so that a sufficient consolidation can be carried out when there is no data, as illustrated in FIG. 4, wherein (a) illustrates an input point cloud, and (b) illustrates a result of grid reconstruction directly made based on the input point cloud; (c) illustrates a result of WLOP processing based on (b), and (d) illustrates corresponding grid reconstruction; (e) illustrates a result obtained by processing in our method based on (b), and (f) illustrates corresponding grid reconstruction. It can be seen that, a good consolidation can be achieved even at the place where data is lost using our method.

2. Direction constraint WLOP is proposed. The present disclosure proposes projecting the "attractive force" and the "repulsive force" in WLOP onto the normal vector and the tangent plane of the model surface respectively, which brings two major advantages: firstly, the "attractive force" is only effective in the direction of the normal vector of the surface point (the meaning of the surface point is substantially the same as that of the sample point), i.e., the surface point can only move along the positive and negative directions of the normal vector under the effect of the "attractive force". Thus, as compared with WLOP, the sample point probably goes beyond the boundary of the input model, i.e., enters a region not supported by the input point, and then the hole filling is possible. Otherwise, when a calculation is made using the original "attractive force", the sample point still will be attracted back by the "attractive force" of a large weight, even if it is pushed out of the boundary of the model by the "repulsive force", and the effect of hole filling cannot be achieved. Secondly, the "repulsive force" is only effective in the direction of the tangent plane of the surface point, i.e., the surface point can only move along the direction of the tangent plane under the effect of the "repulsive force", which ensures that the sample point just moves along the current local plane regardless of the existence of data. By using this technique, in the perspective of the effect, the sample point distribution is smoother in a region having data than WLOP, and in a region having no data, it is equivalent to gradually extrapolating existed data into that region to achieve a smooth hole filling, as shown in FIG. 4.

3. New normal vector calculation mode. As can be seen from the above text, the direction constraint WLOP proposed by us depends on the normal vector of the surface point, while the local tangent plane is also determined by the normal vector. To be noted, our method does not consider the orientation (inward or outward) of the normal vector. Thus, in the region having data, the conventional PCA algorithm can be used to continuously calculate and update the normal vector of the sample point. The key technical difficulty is that in the region having no data, the normal vector calculated directly using PCA is problematic. In a case where data is seriously lost, e.g., a sphere model only has its half scanned, if the normal vector of the sample point is calculated directly using PCA, the sample point will endlessly escape along the tangent plane at the boundary of the model, and a closed hole filling cannot be achieved. With respect to the defect, we for the first time propose correcting the normal vector of the sample point having no data support, using information of the connection line between the surface point and the skeleton point, and the specific algorithm will be introduced later. By using the technique, even in a region where data is seriously lost, the sample point still can well complete the task of hole filling with the aid of the skeleton point.

Point Cloud Skeleton Extraction

The best method for point cloud skeleton extraction is the L1 medial skeleton method, which is briefly introduced as follows.

Figure 5:
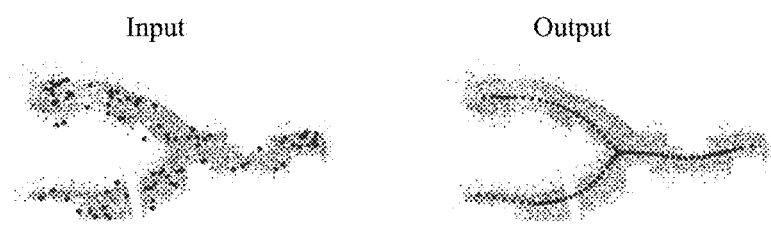
FIG. 5 is a diagram of a comparison before and after an optimization processing of an input point set in an embodiment of the present disclosure.

The core of the L1 medial skeleton method is the local L_1 median value, which can be generalized with the following optimal formula:

$$\underset{x}{\operatorname{argmin}} \sum_{i \in I} \sum_{j \in J} \|x_i - q_j\| \theta(\|x_i - q_j\|) + R(X) \quad (1)$$

wherein, $Q=\{q_j\}_{j \in J} \subset R^3$ is an input point set, $X=\{x_i\}_{i \in I} \subset R^3$ is a point set initially down-sampled from Q, and the number of points in the point set is—|I|<<|J|. After the above formula is minimized, X becomes a normal "skeleton point set" at the center of the input model, as illustrated in FIG. 5, wherein FIG. 5 (*a*) illustrates an input point set, FIG. 5 (*b*) illustrates an output point set after an optimal processing, and wherein the light black points construct an input point set, and the dark black points construct a skeleton point set transformed from the down-sample point set.

Generally, the point distribution condition in a space is described with the degree of dispersion or intensity. On the skeleton branch, the skeleton points are distributed relatively dispersedly in respective dimensions, while on the skeleton trunk, the skeleton points are continuously and intensively in a one-dimensional straight line. As to the three-dimensional sample, we describe the dispersed degree of the sample points by means of the characteristic values of the covariance matrix. As to any sample point $x_i \in I$, its covariance matrix is calculated as:

$$C_i = \sum_{i' \in N\{i\}} \theta(\|x_i - x_{i'}\|)(x_i - x_{i'})^\top (x_i - x_{i'})$$

wherein, the distance weighting function θ has the same function as the local $L_1$ median value, both for considering the local distribution of the sample points, rather than the weight distribution. $x_i$ is a row vector, and $c_i$ is a 3×3 matrix. Next, we calculate three characteristic values $\lambda_i^0 \le \lambda_i^1 \le \lambda_i^2$ of the matrix which have been sorted, and corresponding characteristic vectors—$\{v_i^0, v_i^1, v_i^2\}$. Those three characteristic vectors form an orthogonal frame, and they are the three major directions of the point set. The characteristic value corresponding to one major direction indicates the intensive degree of the points distributed in the major direction, and also may be referred to as energy in that direction. If the three characteristic values are approximate to each other, it means that the intensive degrees of the points distributed in the three major directions are similar, i.e., the distribution of the point set is dispersed in the three-dimensional space. On the contrary, if the maximum characteristic value is much larger than the other two characteristic values, it means that the point set is distributed intensively in a certain direction. We can define a distribution metric to describe the distribution condition of the point set:

$$\sigma_i = \sigma(x_i) = \frac{\lambda_i^2}{\lambda_i^0 + \lambda_i^1 + \lambda_i^2}$$

Since the point distribution measuring tool is available, the definition of the regularization term with point distribution metric in formula (1) can be given as follows:

$$R(X) = \sum_{i \in I} \gamma_i \sum_{i' \in N\{i\}} \frac{\theta(\|x_i - x_{i'}\|)}{\sigma_i \|x_i - x_{i'}\|}$$

wherein, $\{\gamma_i\}_{i \in I}$ is a balance parameter for controlling the balance between the attractive force of the input point and the repulsive force of the sample point.

Now, formula (1) is solved. When the energy function gradient value is 0, the sample point meets the following relation:

$$\sum_{j \in J}(x_i - q_j)\alpha_{ij} - \gamma_i \sum_{i' \in I\setminus\{i\}} \frac{x_i - x_{i'}}{\sigma_i}\beta_{ii'} = 0, i \in I$$

wherein, $\alpha_{ij} = \frac{\theta(\|x_i - q_j\|)}{\|x_i - q_j\|}, j \in J; \beta_{ii'} = \frac{\theta(\|x_i - x_{i'}\|)}{\|x_i - x_{i'}\|^2}, i' \in I\setminus\{i\}$ Setting $\mu = \frac{\gamma_i \sum_{i' \in I\setminus\{i\}} \beta_{ii'}}{\sigma_i \sum_{j \in J} \alpha_{ij}}, \forall i \in I,$ after an organization, it can be obtained that:

$$(1 - \mu\sigma_i)x_i + \mu\sigma_i \frac{\sum_{i' \in I\setminus\{i\}} x_{i'}\beta_{ii'}}{\sum_{i' \in I\setminus\{i\}} \beta_{ii'}} = \frac{\sum_{j \in J} q_j\alpha_{ij}}{\sum_{j \in J} \alpha_{ij}}.$$

This formula can be deemed as an equation where X is an unknown number, i.e., AX=BQ. Thus only when $0 \leq \mu\sigma_i < 1/2$ can it be ensured that A is a nonsingular matrix that is strictly diagonal dominant. Thus, the solution of the equation is $X = A^{-1} BQ$.

By using the moving point iteration method, when the point set of the current iteration is given as $X^k = \{x_i^k\}$, $k=0, 1, \ldots$, the point set of the next iteration is obtained as $X^{k+1} = A^{-1}(X^k)B(X^k)Q$, i.e., $$x_i^{k+1} = \frac{\sum_{j \in J} q_j \alpha_{ij}^k}{\sum_{j \in J} \alpha_{ij}^k} + \mu\sigma_i^k \frac{\sum_{i' \in I\setminus\{i\}}(x_i^k - x_{i'}^k)\beta_{ii'}^k}{\sum_{i' \in I\setminus\{i\}} \beta_{ii'}^k} \text{ wherein,}$$

$\alpha_{ij}^k = \frac{\theta(\|x_i^k - q_j\|)}{\|x_i^k - q_j\|}, j \in J; \beta_{ii'}^k = \frac{\theta(\|x_i^k - x_{i'}^k\|)}{\|x_i^k - x_{i'}^k\|^2},$ $i' \in I\setminus\{i\}; \sigma_i^k = \sigma(x_i^k).$ As can be seen from the above formula, the local repulsive force can be automatically calculated and adjusted when $\sigma_i^k \in (0,1]$.

Figure 6:
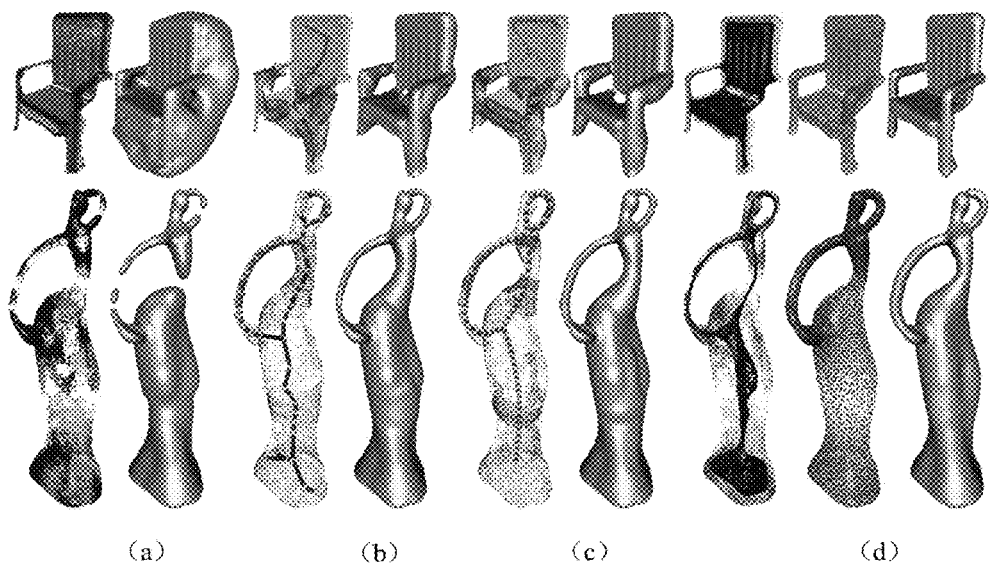
FIG. 6 is a diagram of a comparison between a point cloud presentation in the present disclosure and a point cloud presentation in the prior art.

The L1-medial skeleton is introduced as above, and the present disclosure inherits its idea in the calculation method of the point cloud skeleton, but has the following distinctions:

An important application of the point cloud skeleton extraction is the point cloud data completion. In a case where the data missing is serious, the point cloud skeleton is helpful to ensure that the complemented data well maintains the original topological structure of the model. Observations show that only using the one-dimensional curve skeleton is adverse to the three-dimensional shape completion, and the two-dimensional curved surface skeleton is more convenient to present the non-cylindrical part of an object. As illustrated in FIG. 6, the one-dimensional curve skeleton is helpful to the quasi-cylindrical object completion. However, the unique mixed-type skeleton (one-dimensional curve and two-dimensional curved surface) of this method can better present the part of the non-cylindrical object, thus achieving a better completion effect.

FIG. 6 illustrates the effects of different types of point cloud skeletons on the point cloud completion. (a) illustrates an effect of directly performing a grid reconstruction for an input point cloud; (b) and (c) respectively illustrate the effects of calculating a one-dimensional curve skeleton using an L1 medial skeleton of point cloud and an ROSA point cloud skeleton algorithm and applying it into the point cloud completion. (d) illustrates an effect of performing a point cloud completion for a mixed-type point cloud skeleton calculated with our method.

In the specific algorithm, the solution makes two improvements to the L1-medial skeleton:

(1) The surface points are preliminarily moved inwards using information of the normal vector of the point cloud, so as to obtain a point set inside the object. The main idea of the inward movement of the surface point is that the surface point goes in a direction opposite to its normal vector (i.e., a direction toward the interior of the object) until it encounters a point moving inwards from the opposite side of the object. This preprocessing operation has two advantages: firstly, it avoids the defect of the prior art that the calculated skeleton might be located outside the object. Once the point cloud skeleton is located outside the object, a disastrous influence on the point cloud completion will be caused, which destroys the entire topological structure of the model. Secondly, it avoids the defect that in the L1-medial skeleton, the neighborhood ambiguity is solved by gradually expanding the neighborhood, which greatly saves the calculation amount of the algorithm and the time for the user to adjust the algorithm parameters (initial neighborhood and neighborhood growth rate).

(2) Since the objective of this solution is to form a mixed-type skeleton combining one-dimensional curve and two-dimensional curved surface, the point distribution weighting function $$\sigma_i = \sigma(x_i) = \frac{\lambda_i^2}{\lambda_i^0 + \lambda_i^1 + \lambda_i^2}$$

in the weighted regularization term of the L1-medial skeleton is transformed. The main idea is to replace the weighted regularization term of the L1-medial skeleton with an anisotropic regularization term. The weighted regularization term controls the magnitude of the repulsive force according to the local point distribution condition, while the anisotropic regularization term projects the repulsive force onto each local major direction according to the distribution of the interior points and the distribution of the lines connecting the interior points and the outliers. If the distribution of the local points presents a one-dimensional curve, the repulsive force will only effect on the one-dimensional curve; and if the distribution of the local points presents a two-dimensional curved surface, the repulsive force will only effect on the two-dimensional curved surface. The result is a homogeneously distributed mixed-type skeleton combining one-dimensional curve and two-dimensional curved surface, while avoiding the use of the bridging point in the L1-medial skeleton.

Point Cloud Completion and Reconstruction

As to the point cloud with a large-scale data missing, the Poisson reconstruction algorithm in the prior art is the best method for completion and reconstruction at present.

Figure 7:
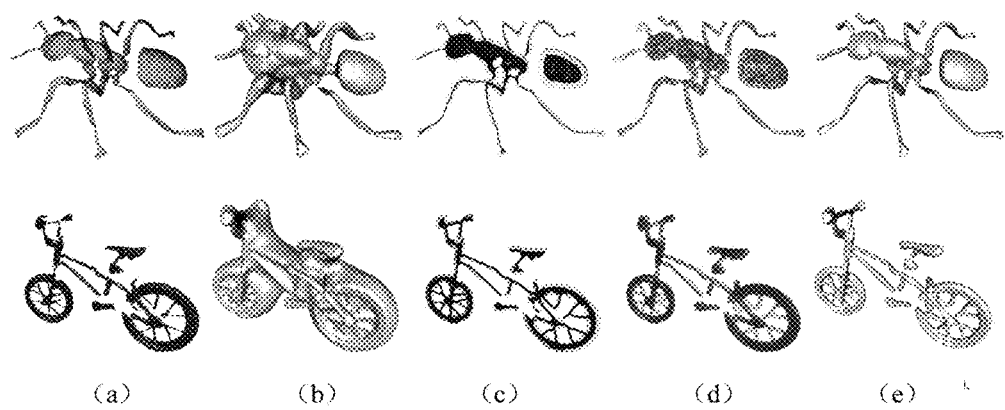
FIG. 7 is a diagram of a comparison between a point cloud presentation in the present disclosure and a point cloud presentation in the prior art.
Figure 8:
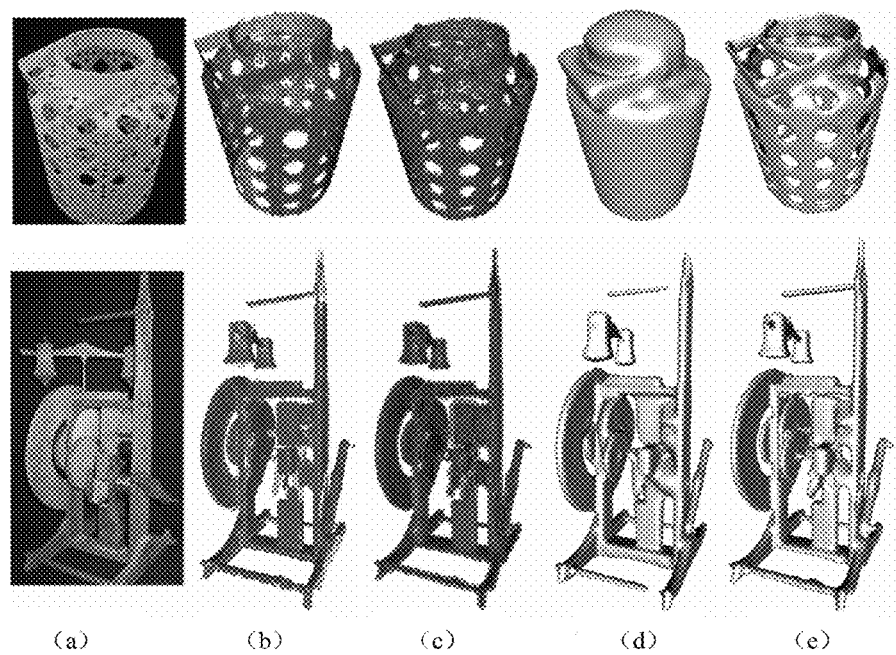
FIG. 8 is a diagram of a comparison between a point cloud presentation in the present disclosure and a point cloud presentation in the prior art.

Such conventional implicit curved surface reconstruction algorithm achieves a good fitting in a region locally having data, but it can only ensure that the output grid is sealed in a region where global data is lost in a large scale. Another method is to complement the lost data using the point cloud skeleton to maintain the global topological structure of the object, and then make a curved surface reconstruction in the conventional method. The method adopted by the present disclosure as well as the L1-medial skeleton and the ROSA skeleton mentioned above belong to the second method. As illustrated in the following two figures, our method uses the skeleton, i.e., the semi-global information, to better recover the entire topological structure of the object, particularly for seriously lost data or slice type data. FIG. 7 (b) illustrates a result of applying the Poisson reconstruction algorithm to the input point cloud in (a); (c), (d) and (e) respectively illustrates skeleton points generated with our method, the consolidated surface points and a result of applying the Poisson reconstruction algorithm to the surface points. FIG. 8 (a) illustrates object pictures; (b) illustrates point clouds consolidated using WLOP; (c) illustrates results of consolidation with our algorithm; (d) illustrates results of using the Possion reconstruction algorithm based on (b); and (e) illustrates results of using the Possion reconstruction algorithm based on (c).

The present disclosure mainly has the following technical contents:

(1) A new point cloud presentation—deep point. Each surface of the deep point is corresponding to a skeleton point. It is a presentation combining information of the local surface and information of the semi-global volume of the object.

(2) A method for extracting a mixed-type point cloud skeleton combining one-dimensional curve and two-dimensional curved surface, which is a key technique of deep point construction.

(3) A point cloud consolidation method that improves WLOP using a deep point, which achieves information supplementation and enhancement in a region having no input data.

Figure 9:
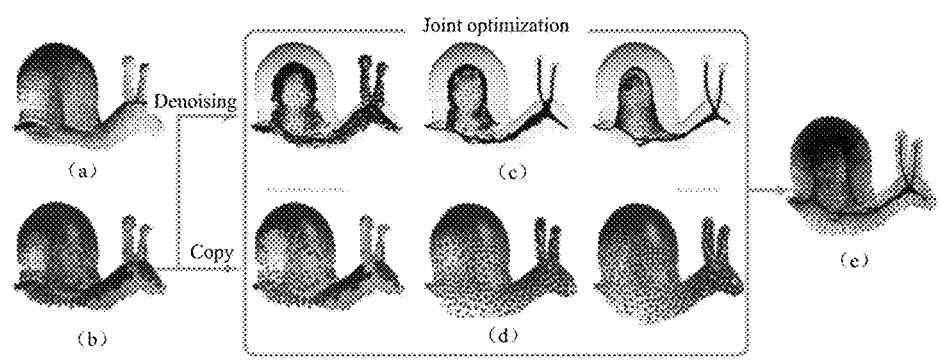
FIG. 9 is a diagram illustrating a real object processing line in an embodiment of the present disclosure.
Figure 10:
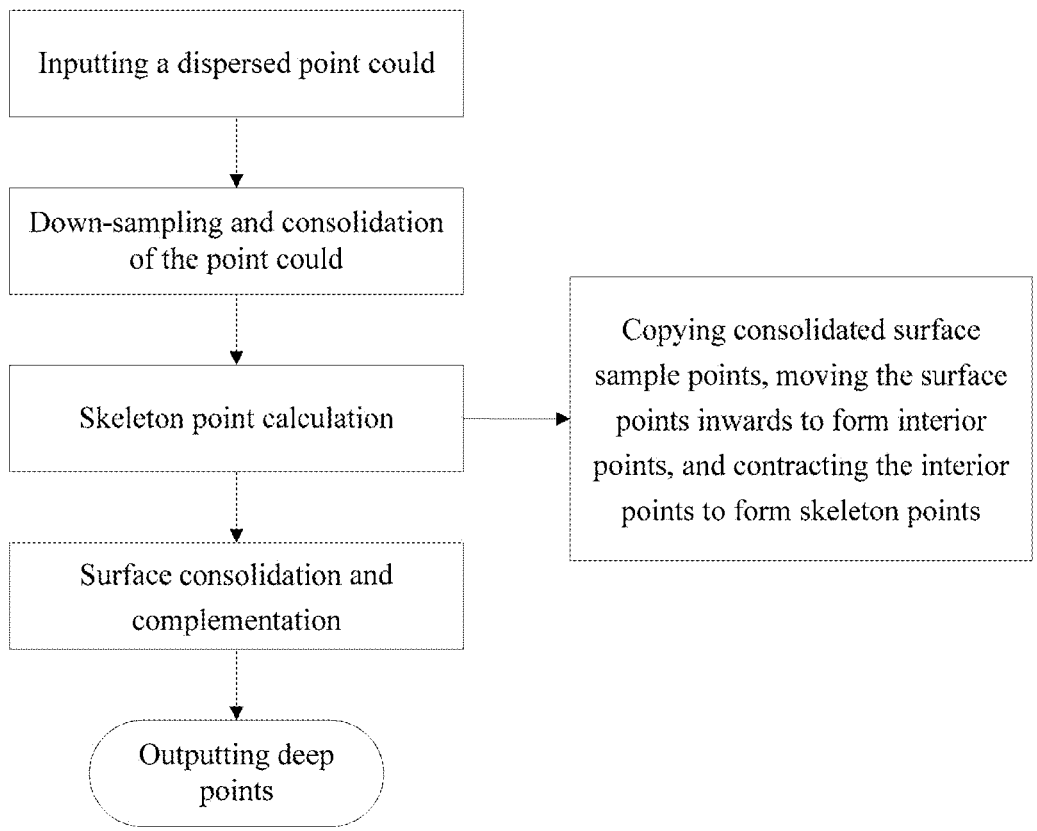
FIG. 10 is a flowchart of a technical solution in an embodiment of the present disclosure.

FIG. 10 is a flowchart of a technical solution in an embodiment of the present disclosure. FIG. 9 illustrates a physical example, wherein an input dispersed point cloud is obtained through a scanning model. Next, a few of points are down-sampled from the point cloud data as shown in (a), and then consolidated and denoised with the conventional WLOP algorithm to obtain the surface points as shown in (b). Next, the skeleton points as shown in (c) are calculated through the surface point inward movement and the interior point contraction. Next, the surface points are further consolidated and complemented using the skeleton points, as shown in (d). Finally, a complete deep point set proposed by us is obtained, as shown in (e). The details will be described as follows step by step.

(1) Point cloud preprocessing, i.e., point cloud down-sampling and WLOP consolidation. For an input point set $C=\{c_j\}_{j \in J} \subset R^3$, we obtain a point set $P=\{p_i\}_{i \in I} \subset R^3$ through a random sampling, and perform a smoothing consolidation thereof using the conventional WLOP algorithm introduced above. Next, we obtain an initial position of an interior skeleton point set $P=\{p_i\}_{i \in I} \subset R^3$ by copying a surface point set P. In that case, the two point sets are completely the same, and any operation of addition or deletion or changing the serial numbers will not be performed on the two point sets in the subsequent algorithm, which certainly ensures that the surface points are always one-to-one corresponding to the skeleton points.

(2) Deep point definition. In the embodiment of the present disclosure, a deep point is formed by a point pair $\langle p_i, q_i \rangle$, wherein $p_i$ and $q_i$ are located on the surface and the interior skeleton of the model, respectively. A complete deep point set $<P,Q>=\{<p_i,q_i>\}_{i \in I} \subset R^6$ shall meet the following characteristics:

the surface point set P is located on the implicit curved surface of the model and uniformly distributed;

the skeleton point set Q forms a mixed-type skeleton composed of a one-dimensional curve and a two-dimensional curved surface;

the direction $m_i=(p_i-q_i)/\|p_i-q_i\|$ of the deep point pair is consistent with the normal vector of the surface point.

(3) Neighborhood size determination. The average distance r between each sample point and a closest adjacent point after the WLOP consolidation is calculated as follows and taken as a criterion for the main parameters.

$$r = \frac{1}{|P|} \sum_{i \in I} \min_{i' \in N(i)} \|p_i - p_{i'}\|$$

Firstly, the neighborhood of the surface points is defined as $$\tilde{P}\{p_{i'} \mid \|p_{i'} - p_i\| < \sigma_p r\},$$

wherein the default value of $\sigma_p$ is 5. The neighborhood of the interior points is $$\tilde{Q}_i\{q_{i'} \mid \|q_{i'} - q_i\| < \sigma_q r\},$$

wherein the default value of $\sigma_q$ is 2. The neighborhood of the surface points is static and only needs to be calculated for one time, while the neighborhood of the interior points is dynamic and needs to be recalculated for each iteration.

(4) The surface points move inwards to form interior points. That is, the copies of surface point set functioning as the initial positions of the skeleton points move inward. The point set $Q=\{q_i\}_{i \in I} \subset R^3$ preliminarily moves inwards through information of the normal vector of the point cloud to obtain an interior point set inside the object.

The main idea of the point inward movement is to cause the point to move in a direction opposite to its normal vector (i.e., a direction toward the interior of the object) until it encounters a point moving inwards from the opposite side of the object. Firstly, the condition of stopping the point inward movement is defined as that, in a neighborhood $Q_i$ of the point, the maximum angle between the normal vector of the sample point and those of neighboring points is smaller than a threshold, i.e., $$\max_{i' \in I_i^Q} n_{i'} \cdot n_i \leq \cos(\omega),$$

wherein the default value of $\omega$ is 45°. Next, each interior point moves along a direction opposite to the normal vector, i.e., $q_i=q_i-tn_i$. In the beginning, the moving step length t of each point is set as r/2. In the subsequent movement, the moving step length of each sample point is an average value of the moving step lengths of its adjacent point in the previous iteration, and the dynamic neighborhood $$Q_i\{q_{i'} \mid \|q_{i'} - q_i\| < \sigma_q r\}$$

is used. Secondly, after each step of movement, a bilateral smoothing is performed for the current interior points to ensure that the interior points are densely connected as much as possible, i.e., $$q_i = \frac{\sum_{i' \in I_i^P} \theta(p_i, p_{i'})\phi(n_i, n_{i'})q_{i'}}{\sum_{i' \in I_i^P} \theta(p_i, p_{i'})\phi(n_i, n_{i'})},$$

wherein $\theta(q_i, q_{i'}) = e^{-\left(\frac{\|q_i - q_{i'}\|}{r}\right)^2}$ and $\phi(n_i, n_{i'}) = e^{-\left(\frac{1 - n_i^T n_{i'}}{1 - \cos(\omega)}\right)^2}$.

Figure 11:
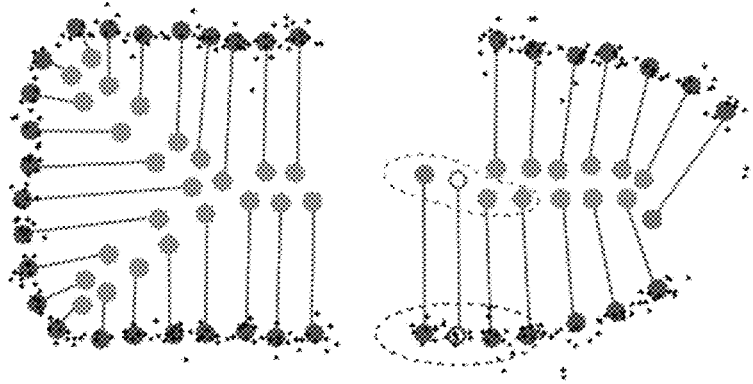
FIG. 11 is a diagram illustrating a surface point inward movement and two neighborhoods in an embodiment of the present disclosure.

FIG. 11 is a diagram illustrating a surface point inward movement and two neighborhoods in an embodiment of the present disclosure.

(5) The interior points contract to form the skeleton points. Firstly, the point set obtained in step (4) is copied as an interior point set $H = \{h_i\}_{i \in I}$, and the point set Q is further contracted and normalized to form the skeleton points, i.e., the optimization is solved:

$$\underset{Q}{\operatorname{argmin}} \sum_{i \in I} \sum_{k \in I} \vartheta(q_i, h_k) \|q_i - h_k\| + R(Q),$$

wherein $\vartheta(q_i, h_k) = e^{-d_e^2(q_i, h_k)/r^2}$.

Being different from the conventional L1 medial skeleton, in the embodiment of the present disclosure, a self-adaptive anisotropic neighborhood is used as the regularization term. The purpose is that in the cylindrical part, the shape of the neighborhood range presents a thin and long ellipsoid; in the quasi-planar part, the shape of the neighborhood range presents a large and flat ellipsoid; at the end point and the edge of the planar part, the shape of the neighborhood range presents a small ellipsoid, so as to avoid the excessive contraction of the boundary and keep the entire shape. For this purpose, we make a principal component analysis (PCA) for the neighborhood $Q_i$ of $q_i$ to obtain three principal axes $\{\check{v}_i^1, \check{v}_i^2, \check{v}_i^3\}$ of the neighborhood ellipsoid, which have lengths $\{l_i^1, l_i^2, l_i^3\}$. Next, the normal vectors of the points within the neighborhood $\tilde{Q}$ are projected onto each principal axis, and the length of each axis is determined through the following equation:

$$l_i^m = \left(\frac{\sum_{i' \in I_i |\check{v}_i^{T m}|}}{|i|} + \epsilon\right)^{-1} \quad m = 1, 2, 3,$$

wherein the default parameter of $\epsilon$ is 0.1. Thus, back to the above optimization equation, it may be defined that $$R(Q) = \sum_{i \in I} \lambda_i \sum_{i' \in N\{i\}} \frac{\vartheta(q_i, q_{i'})}{\|d_e(q_i, q_{i'})\|^3},$$

-continued wherein $d_e(q_i, h_k) = \left\|\overset{\circ}{A_i}^T (q_i - h_k)\right\|$ and $$\overset{\circ}{A_i} = [\check{v}_i^1 / l_i^1; \check{v}_i^2 / l_i^2; \check{v}_i^3 / l_i^3].$$

By analyzing the optimization, the following analytic expression can be deduced:

$$q_i = \frac{\sum_{i' \in N\{i\}} \alpha_{ii'} q_{i'}}{\sum_{i' \in N\{i\}} \alpha_{ii'}} + \mu \|l_i\|^2 \frac{\sum_{i' \in N\{i\}} \beta_{ii'} \overset{\circ}{A_i}^T \overset{\circ}{A_i}(q_i - q_{i'})}{\sum_{i' \in N\{i\}} \beta_{ii'}}$$

wherein $\alpha_{ii'} = \frac{\vartheta(q_i, q_{i'})}{\|q_i - q_{i'}\|}$, $\beta_{ii'} = \frac{\vartheta(q_i, q_{i'})}{\|d_e(q_i - q_{i'})\|^5}$, $$\mu \|l_i\|^2 = \lambda_i \sum_{i' \in N\{i\}} \beta_{ii'} / \sum_{i' \in N\{i\}} \alpha_{ii'},$$

$l_i = [l_i^1; l_i^2; l_i^3]$, and the default parameter $\mu = 0.4$.

(6) Consolidation and completion of the surface points. Being different from the conventional WLOP algorithm, our optimization has three terms:

$$\underset{P}{\operatorname{argmin}} \sum_{i \in I} \eta(p_i) \sum_{c_j \in i} \theta(p_i, c_j) \|(p_i - c_j) n_i^T\| + \hat{R}(P) + G(P)$$

The first term is a data fitting term, wherein local input points are taken as a neighborhood $C_i = \{c_j \| \|c_j - p_i\| < \sigma_p r\}$. $\eta(p_i) = 1 + \Sigma_{c_j \in i} \theta(c_j, p_i)$ is a density function, i.e., the weight of the data fitting term increases when the surface point is closer to the source point. The second term $\hat{R}(P)$ is a regularization term, which is defined as $$\hat{R}(P) = \sum_{i \in I} \sum_{i' \in N\{i\}} \frac{\theta(p_i, p_{i'})}{\|B_i^T (p_i - p_{i'})\|^3}, \text{ wherein } B_i = [u_i^1; u_i^2],$$

which are any two orthogonal vectors on the tangent plane perpendicular to the normal vector. The third term G(P) is a shape (volume) preservation term, which is defined as $$G(P) = \frac{1}{2} \sum_{i \in I} \gamma(p_i)(\|p_i - q_i\| - L(p_i))^2,$$

wherein $$L(p_i) = \frac{\sum_{i' \in I_i^P} \theta(p_i, p_{i'}) \|p_{i'} - q_{i'}\|}{\sum_{i' \in I_i^P} \theta(p_i, p_{i'})}$$

is an average volume thickness of the current point. $\gamma(p_i) = (1 + \operatorname{var}(\{\|p_i - q_i\|\}_{i' \in I_i^P}))^{-1}$ is a weighting function, i.e., the weight of the shape preservation term increases when the difference between local volume thicknesses decreases. In addition, upon different requests, the volume preservation term may be replaced with a volume minimization, i.e., $G(P)=1/2\Sigma_{i\in\bar{i}}\gamma(p_i)(L(p_i))^2$.

By solving the above optimization, the following analytic expression can be obtained:

$$p_i = \frac{\eta(p_i)\sum_{c_j\in i}\alpha_{ij}(c_j - p_i)n_i^T}{\gamma(p_i)+\eta(p_i)\sum_{c_j\in i}\alpha_{ij}} +$$

$$\frac{\gamma(p_i)(q_i+L(p_i)m_i)}{\gamma(p_i)+\eta(p_i)\sum_{c_j\in i}\alpha_{ij}} + \hat{\mu}\frac{\sum_{i'\in N\{i\}}\hat{\beta}_{ii'}\mathring{A}_i^T\mathring{A}_i(p_i-p_{i'})}{\sum_{i'\in N\{i\}}\hat{\beta}_{ii'}}$$

wherein $$\alpha_{ij}=\frac{\theta(p_i,c_j)}{\|p_i-c_j\|},\ \hat{\beta}_{ii'}=\frac{\theta(p_i,p_{i'})}{\|B_i^T(p_i-p_{i'})\|^5},$$

$$\hat{\mu}=\sum_{i'\in N\{i\}}\hat{\beta}_{ii'}\bigg/\bigg(\gamma(p_i)+\eta(p_i)\sum_{c_j\in i}\alpha_{ij}\bigg),\ \text{and}$$

i' is an adjacent point of the sample point.

(7) Normal vector correction. In each iteration, the normal vector obtained by the PCA calculation is corrected using the orientation of the deep point and the distribution condition of the input points around the point, i.e., the normal vector in step (6) is corrected, and the corrected normal vector is $$n_i = \frac{(\eta(p_i)-1)\tilde{n}_i+m_i}{\|(\eta(p_i)-1)\tilde{n}_i+m_i\|}.$$

The present disclosure proposes a new point cloud presentation, i.e., the deep point which has its surfaces one-to-one corresponding to the skeleton points. It is a presentation combines information of the local surface and information of the semi-global volume of the object, and can be applied to the aspects such as point cloud completion and reconstruction, feature extraction, point cloud deformation, and point cloud registration.

The present disclosure further proposes a method for extracting a mixed-type point cloud skeleton combining one-dimensional curve and two-dimensional curved surface, and this method is the key technique for the deep point construction. As compared with the conventional one-dimensional curve skeleton, the mixed-type skeleton has a richer presenting capability, and can be applied to the aspects such as point cloud completion, three-dimensional matching search, and three-dimensional animation.

A point cloud consolidation method which improves the WLOP algorithm using a deep point. The conventional WLOP algorithm can only perform denoising and smoothing in a region having input data, while the present method can perform data supplementation and enhancement in a region having no input data.

A technical concept of performing joint consolidation of the surface point and the skeleton point in the process of forming the deep point. That is, the formation of the skeleton point is dependent on relation information such as the surface neighborhood provided by the consolidated surface points. The completion and enhancement of the surface point is dependent on information such as volume and orientation (inward or outward) provided by the formed skeleton point. They are supplementary to each other, and the iterative consolidation can be repetitively performed continuously.

As compared with the existed methods for point cloud denoising and skeleton extraction, the present disclosure proposes a point cloud skeleton presentation more beneficial to the point cloud completion, and combines the concept of deep point, so that the existed best method for point cloud denoising, i.e., WLOP, can perform a point cloud completion at the same time of denoising. As compared with a three-dimensional reconstruction made directly, a three-dimensional reconstruction made based on the complemented and consolidated point cloud can better deal with the situation of large-scale data missing, and the reconstructed model is more accurate in the topological structure.

A person skilled in the art shall understand that the embodiments of the present disclosure can be provided as a method, a system or a computer program product. Therefore, the present disclosure can take the form of a full hardware embodiment, a full software embodiment, or an embodiment with combination of software and hardware aspects. Moreover, the present disclosure can take the form of a computer program product implemented on one or more computer usable storage mediums (including, but not limited to, a magnetic disc memory, CD-ROM, optical storage, etc.) containing therein computer usable program codes.

The present disclosure is described with reference to a flow diagram and/or block diagram of the method, device (system) and computer program product according to the embodiments of the present disclosure. It shall be understood that each flow and/or block in the flow diagram and/or block diagram and a combination of the flow and/or block in the flow diagram and/or block diagram can be realized by the computer program instructions. These computer program instructions can be provided to a general computer, a dedicated computer, an embedded processor or a processor of other programmable data processing device to generate a machine, such that the instructions performed by the computer or the processor of other programmable data processing devices generate the device for implementing the function designated in one flow or a plurality of flows in the flow diagram and/or a block or a plurality of blocks in the block diagram.

These computer program instructions can also be stored in a computer readable memory capable of directing the computer or other programmable data processing devices to operate in a specific manner, such that the instructions stored in the computer readable memory generate a manufactured article including an instruction device that implements the function(s) designated in one flow or a plurality of flows in the flow diagram and/or a block or a plurality of blocks in the block diagram.

These computer program instructions can also be loaded onto the computer or other programmable data processing devices, such that a series of operation steps is executed on the computer or other programmable devices to generate the processing realized by the computer, therefore the instructions executed on the computer or other programmable devices provide the steps for implementing the function designated in one flow or a plurality of flows in the flow chart and/or a block or a plurality of blocks in the block diagram.

The above are only the preferable embodiments of the present disclosure, and are not used for limiting the present disclosure. For a person skilled in the art, the embodiments of the present disclosure can be modified and changed variously. Any modification, equivalent substitutions and improvements within the spirit and principle of the present disclosure shall be contained in the protection scope of the present disclosure.

The invention claimed is:

1. A three-dimensional point cloud model reconstruction method, comprising:
 1) sampling and WLOP-consolidating an input point set to generate an initial surface point set, copying the initial surface point set as an initial position of an interior skeleton point set, to establish a correspondence relation between surface points and skeleton points;
 2) moving points in the interior skeleton point set inwards along a direction opposite to a normal vector thereof, to generate interior points;
 3) using a self-adaptive anisotropic neighborhood as a regularization term to perform an optimization of the interior points, and generating skeleton points;
 4) performing a consolidation and completion of the initial surface point set using the skeleton points, to generate consolidated surface points;
 5) reconstructing a three-dimensional point cloud model according to the skeleton points, the surface points and the correspondence relation between the surface points and the skeleton points;
wherein establishing a correspondence relation between surface points and skeleton points in step 1) comprises:
constructing a deep point set $<P,Q>=\{<p_i,q_i>\}_{i \in I} \subset R^6$ according to the surface point set and the skeleton point set, a deep point in the deep point set being composed of a point pair $<p_i,q_i>$, wherein $p_i$s a point in the surface point set $P=\{p_i\}_{i \in I} \subset R^3$, $q_i$ is a point in the skeleton point set $Q=\{q_i\}_{i \in I} \subset R^3$, and I is a sampled point set;
a direction of a deep point pair is $m_i=(p_i-q_i)/\|p_i-q_i\|$ and consistent with a normal vector of the surface point;
between step 1) and step 2), further comprising:
determining a size of a neighborhood of each point in the surface point set and the interior skeleton point set, wherein,
the neighborhood of the surface point is $$\tilde{P} = \{p_{i'} \mid \|p_{i'} - p_i\| < \sigma_p r\},$$

wherein a default value of $\sigma_p$ is 5;
the neighborhood of the interior skeleton point is $$\tilde{Q}_i = \{q_{i'} \mid \|q_{i'} - q_i\| < \sigma_q r\},$$

wherein a default value of $\sigma_q$ is 2; r is an average distance $$r = \frac{1}{|P|} \sum_{i \in I} \min_{i \in N\{i\}} \|p_i - p_{i'}\|$$

between each sample point and an adjacent point; $|P|$ is the number of the surface points; $p_i$ is a point in the surface point set, and $p_{i'}$ is a surface point adjacent to $p_i$.

2. The three-dimensional point cloud model reconstruction method according to claim 1, wherein moving points in the interior skeleton point set inwards along a direction opposite to a normal vector thereof, to generate interior points in step 2) comprises:
 determining a condition for stopping the inward movement of each sample point in the interior skeleton point set, wherein the condition for stopping the inward movement of the sample point is that in a neighborhood $\tilde{Q}$ of the sample point, the maximum angle between the normal vector of sample point and those of neighboring points is smaller than a preset threshold $$\omega, \text{ i.e., } \max_{i' \in I_i^Q} n_{i'} \cdot n_i \leq \cos(\omega)$$

wherein a default value of $\omega$ is 45°;
 moving each sample point along a direction opposite to a normal vector thereof according to the determined condition for stopping the inward movement of the sample point;
 after each step of movement of each point, a bilateral smoothing is performed for the current point to determine that $$q_i = \frac{\sum_{i' \in I_i^P} \theta(p_i, p_{i'})\phi(n_i, n_{i'})q_{i'}}{\sum_{i' \in I_i^P} \theta(p_i, p_{i'})\phi(n_i, n_{i'})}, \text{ wherein}$$

$$\theta(p_i, p_{i'}) = e^{-\left(\frac{\|p_i - p_{i'}\|}{l^P}\right)^2}, \phi(n_i, n_{i'}) = e^{-\left(\frac{1-n_i^T n_{i'}}{1-\cos(\omega)}\right)^2}, I_i^P$$

is a surface point set, $n_i$ is a normal vector of the sample point, and $n_{i'}$ is a normal vector of an adjacent point.

3. The three-dimensional point cloud model reconstruction method according to claim 2, wherein moving each sample point along a direction opposite to a normal vector thereof further comprises:
 an initial moving step length t of each sample point is r/2, wherein r is an average distance between each sample point and a closest adjacent point;
 a subsequent moving step length of each sample point is an average value of the moving step lengths of its adjacent point in a previous iteration, and a dynamic neighborhood $$Q_i = \{q_{i'} \mid \|q_{i'} - q_i\| < \sigma_q r\} \text{ is used.}$$

4. The three-dimensional point cloud model reconstruction method according to claim 3, wherein using a self-adaptive anisotropic neighborhood as a regularization term to perform an optimization of the interior points, and generating skeleton points in step 3) comprises:
 making a principal component analysis (PCA) for the interior point set to determine three principal axes and lengths thereof;
 determining the regularization term according to the determined principal axes and lengths thereof, wherein, $$R(Q) = \sum_{i \in I} \lambda_i \sum_{i' \in N\{i\}} \frac{\vartheta(q_i, q_{i'})}{\|d_e(q_i, q_{i'})\|^3}$$

$$d_e(q_i, h_k) = \|\mathring{A}_i^T(q_i - h_k)\|,$$

$$\mathring{A}_i = [v_i^1/l_i^1; v_i^2/l_i^2; v_i^3/l_i^3],$$

$v_i^1$, $v_i^2$, $v_i^3$ are three determined principal axes, and $l_i^1$, $l_i^2$, $l_i^3$ are the lengths of the three principal axes;
analyzing an optimization $$\underset{Q}{\operatorname{argmin}} \sum_{i \in I} \sum_{k \in I} \vartheta(q_i, h_k) \|q_i - h_k\| + R(Q)$$

according to the determined regularization term to generate the skeleton points;
wherein, $$\vartheta(q_i, h_k) = e^{-d_e^2(q_i, h_k)/r^2}$$

is the self-adaptive anisotropic neighborhood, $h_k$ is a stationary point in the interior point set $H = \{h_i\}_{i \in I}$, $Q$ is a skeleton point set generated after the consolidation, $q_i$ is a point in the skeleton point set generated after the consolidation, and $R(Q)$ is the regularization term.

5. The three-dimensional point cloud model reconstruction method according to claim 4, wherein an analytic expression of the skeleton point in the skeleton point set is:

$$q_i = \frac{\sum_{i' \in N\{i\}} \alpha_{ii'} q_{i'}}{\sum_{i' \in N\{i\}} \alpha_{ii'}} + \mu \|l_i\|^2 \frac{\sum_{i' \in N\{i\}} \beta_{ii'} \mathring{A}_i^T \mathring{A}_i (q_i - q_{i'})}{\sum_{i' \in N\{i\}} \beta_{ii'}}$$

wherein $$\alpha_{ii'} = \frac{\vartheta(q_i, q_{i'})}{\|q_i - q_{i'}\|},$$

$$\beta_{ii'} = \frac{\vartheta(q_i, q_{i'})}{\|d_e(q_i, q_{i'})\|^5},$$

$$\mu \|l_i\|^2 = \lambda_i \sum_{i' \in N\{i\}} \beta_{ii'} \bigg/ \sum_{i' \in N\{i\}} \alpha_{ii'},$$

$$d_e(q_i, q_i') = \left\|\mathring{A}_i^T(q_i - q_i')\right\|, l_i = [l_i^1; l_i^2; l_i^3], \mu = 0.4, \text{ and } q_{i'}$$

is a point closest to the skeleton point $q_i$.

6. The three-dimensional point cloud model reconstruction method according to claim 5, wherein performing a consolidation and completion of the initial surface point set using the skeleton points, to generate consolidated surface points comprises:
solving optimization $$\underset{P}{\operatorname{argmin}} \sum_{i \in I} \eta(p_i) \sum_{c_j \in i} \theta(p_i, c_j) \|(p_i - c_j) n_i^T\| + \hat{R}(P) + G(P)$$

to perform the consolidation and completion of the initial surface point set;
wherein, $\eta(p_i)$ is a density function, $$\eta(p_i) = 1 + \sum_{c_j \in i} \theta(c_j, p_i),$$

$$\theta(c_j, p_i) = e^{-\left(\frac{\|c_j - p_i\|}{r}\right)^2}, \text{ and } r = \frac{1}{|P|} \sum_{i \in I} \min_{i' \in N\{i\}} \|p_i - p_{i'}\|;$$

$\hat{R}(P)$ is a regularization term, $$\hat{R}(P) = \sum_{i \in I} \sum_{i' \in N\{i\}} \frac{\theta(p_i, p_{i'})}{\|B_i^T(p_i - p_{i'})\|^3},$$

$$\theta(p_i, p_{i'}) = e^{-\left(\frac{\|p_i - p_{i'}\|}{r}\right)^2}, \text{ and } B_i = [u_i^1; u_i^2],$$

which are any two orthogonal vectors on a tangent plane perpendicular to the normal vector;
$n_i$ is a normal vector of the surface point, $G(P)$ is a volume preservation term determined according to the skeleton point, $q_i$ is a point in the determined skeleton point set, and $p_i$ is a point in the initial surface point set.

7. The three-dimensional point cloud model reconstruction method according to claim 6, wherein the volume preservation term is $$G(P) = \frac{1}{2} \sum_{i \in I} \gamma(p_i)(\|p_i - q_i\| - L(p_i))^2, \text{ wherein,}$$

$\gamma(p_i)$ is a weighting function, $$\gamma(p_i) = \left(1 + \operatorname{var}\left(\{\|p_{i'} - q_{i'}\|\}_{i' \in I_i^P}\right)\right)^{-1},$$

$$L(p_i) = \frac{\sum_{i' \in I_i^P} \theta(p_i, p_{i'}) \|p_{i'} - q_{i'}\|}{\sum_{i' \in I_i^P} \theta(p_i, p_{i'})}, L(p_i)$$

is an evaluated volume thickness of the current point determined according to the skeleton point, $q_i$ is a point in the determined skeleton point set, and $p_i$ is a point in the initial surface point set.

8. The three-dimensional point cloud model reconstruction method according to claim 7, wherein the consolidated surface point is $$p_i = \frac{\eta(p_i)\sum\limits_{c_j \in i} \alpha_{ij}(c_j - p_i)n_i^T}{\gamma(p_i) + \eta(p_i)\sum\limits_{c_j \in i} \alpha_{ij}} + \frac{\gamma(p_i)(q_i + L(p_i)m_i)}{\gamma(p_i) + \eta(p_i)\sum\limits_{c_j \in i} \alpha_{ij}} +$$

$$\hat{\mu}\frac{\sum\limits_{i' \in N\{i\}} \hat{\beta}_{ii'} \overset{\circ}{A}_i^T \overset{\circ}{A}_i(p_i - p_{i'})}{\sum\limits_{i' \in N\{i\}} \hat{\beta}_{ii'}} \text{wherein, } \alpha_{ij} = \frac{\theta(p_i, c_j)}{\|p_i - c_j\|},$$

$$\hat{\beta}_{ii'} = \frac{\theta(p_i, p_{i'})}{\|B_i^T(p_i - p_{i'})\|^5}, \hat{\mu} = \sum_{i' \in N\{i\}} \hat{\beta}_{ii'} \bigg/ \bigg(\gamma(p_i) + \eta(p_i)\sum_{c_j \in i}\alpha_{ij}\bigg), B_i = \Big[\tilde{u}_i^1; \tilde{u}_i^2\Big],$$

which are any two orthogonal vectors on a tangent plane perpendicular to the normal vector; $m_i$ is a direction of a deep point pair; i' is an adjacent point of the sample point.

9. The three-dimensional point cloud model reconstruction method according to claim 8, further comprising, between step 4) and step 5):

correcting the normal vector obtained through the PCA calculation using the orientation of the deep point, and a distribution condition of the input points around the deep point, i.e., $$n_i = \frac{(\eta(p_i) - 1)\tilde{n}_i + m_i}{\|(\eta(p_i) - 1)\tilde{n}_i + m_i\|}.$$

10. The three-dimensional point cloud model reconstruction method according to claim 6, wherein the volume preservation term is $$G(P) = \frac{1}{2}\sum_{i \in I} \gamma(p_i)(L(p_i))^2,$$

$\gamma(p_i)$ is a weighting function, $$\gamma(p_i) = \big(1 + \text{var}\big(\{\|p_{i'} - q_{i'}\|\}_{i' \in I_i^P}\big)\big)^{-1},$$

$$L(p_i) = \frac{\sum\limits_{i' \in I_i^P} \theta(p_i, p_{i'})\|p_{i'} - q_{i'}\|}{\sum\limits_{i' \in I_i^P} \theta(p_i, p_{i'})}, L(p_i)$$

is an evaluated volume thickness of the current point determined according to the skeleton point, $q_i$ is a point in the determined skeleton point set, and $p_i$ is a point in the initial surface point set.

11. The three-dimensional point cloud model reconstruction method according to claim 10, wherein the consolidated surface point is $$p_i = \frac{\eta(p_i)\sum\limits_{c_j \in i} \alpha_{ij}(c_j - p_i)n_i^T}{\gamma(p_i) + \eta(p_i)\sum\limits_{c_j \in i} \alpha_{ij}} +$$

$$\frac{\gamma(p_i)(q_i + L(p_i)m_i)}{\gamma(p_i) + \eta(p_i)\sum\limits_{c_j \in i} \alpha_{ij}} + \hat{\mu}\frac{\sum\limits_{i' \in N\{i\}} \hat{\beta}_{ii'} \overset{\circ}{A}_i^T \overset{\circ}{A}_i(p_i - p_{i'})}{\sum\limits_{i' \in N\{i\}} \hat{\beta}_{ii'}}$$

wherein, $\alpha_{ij} = \frac{\theta(p_i, c_j)}{\|p_i - c_j\|}, \hat{\beta}_{ii'} = \frac{\theta(p_i, p_{i'})}{\|B_i^T(p_i - p_{i'})\|^5},$ $$\hat{\mu} = \sum_{i' \in N\{i\}} \hat{\beta}_{ii'} \bigg/ \bigg(\gamma(p_i) + \eta(p_i)\sum_{c_j \in i}\alpha_{ij}\bigg), B_i = \Big[\tilde{u}_i^1; \tilde{u}_i^2\Big],$$

which are any two orthogonal vectors on a tangent plane perpendicular to the normal vector; $m_i$ is a direction of a deep point pair; i' is an adjacent point of the sample point.

12. A device, comprising:
a scanning module for scanning a model to acquire an input point set;
a memory for storing program instructions; and
a processor connected to the scanning module and the memory, for executing the program instructions in the memory, and processing the input point set according to the steps in claim 1.

* * * * *